(12) United States Patent
Sakakibara et al.

(10) Patent No.: US 9,951,258 B2
(45) Date of Patent: Apr. 24, 2018

(54) POLYESTER RESIN, HOT MELT ADHESIVE, AND HOT MELT ADHESIVE SOLUTION

(71) Applicant: GOO CHEMICAL CO., LTD., Kyoto (JP)

(72) Inventors: Teru Sakakibara, Kyoto (JP); Koji Maeda, Kyoto (JP); Yusuke Numamoto, Osaka (JP)

(73) Assignee: GOO CHEMICAL CO., LTD., Kyoto (JP)

( * ) Notice: Subject to any disclaimer, the term of this patent is extended or adjusted under 35 U.S.C. 154(b) by 0 days.

(21) Appl. No.: 14/909,006

(22) PCT Filed: Jul. 30, 2013

(86) PCT No.: PCT/JP2013/004613
§ 371 (c)(1),
(2) Date: Jan. 29, 2016

(87) PCT Pub. No.: WO2015/015529
PCT Pub. Date: Feb. 5, 2015

(65) Prior Publication Data
US 2016/0194533 A1    Jul. 7, 2016

(51) Int. Cl.
| | | |
|---|---|---|
| *C08G 63/181* | (2006.01) | |
| *C09J 167/02* | (2006.01) | |
| *C08G 63/16* | (2006.01) | |
| *C08G 63/183* | (2006.01) | |

(52) U.S. Cl.
CPC ............ *C09J 167/02* (2013.01); *C08G 63/16* (2013.01); *C08G 63/183* (2013.01)

(58) Field of Classification Search
CPC .............................. C08G 63/16; C08G 63/181
See application file for complete search history.

(56) References Cited

U.S. PATENT DOCUMENTS

| | | | | |
|---|---|---|---|---|
| 4,052,368 A | * | 10/1977 | Larson | C08G 63/688 428/481 |
| 4,102,944 A | | 7/1978 | Fukuyama et al. | |
| 2004/0067284 A1 | | 4/2004 | Sankey et al. | |
| 2005/0249906 A1 | | 11/2005 | Sankey et al. | |
| 2010/0016543 A1 | | 1/2010 | Brenner et al. | |
| 2010/0112251 A1 | * | 5/2010 | Shelby | C09J 167/02 428/35.7 |

FOREIGN PATENT DOCUMENTS

| | | |
|---|---|---|
| JP | 52-39785 A | 3/1977 |
| JP | 52-155640 A | 12/1977 |
| JP | 2002-3810 A | 1/2002 |
| JP | 2004-518007 A | 6/2004 |
| JP | 2005-2141 A | 1/2005 |
| JP | 2006-206860 A | 8/2006 |
| JP | 2008-248016 A | 10/2008 |
| JP | 2010-516847 A | 5/2010 |
| JP | 2012-211307 A | 11/2012 |

OTHER PUBLICATIONS

Trimethylene Glycol (1,3-Propanediol) Product Identification; chemicalland21.com; Mar. 20, 2017.*
International Search Report for the Application No. PCT/JP2013/004613 dated Oct. 15, 2013.

* cited by examiner

*Primary Examiner* — Michael Pepitone
(74) *Attorney, Agent, or Firm* — Cheng Law Group, PLLC

(57) ABSTRACT

The polyester resin for a hot melt adhesive includes polycarboxylic acid residues and polyhydric alcohol residues. The polycarboxylic acid resides contain aliphatic polycarboxylic acid residues in a proportion within the range of 50 to 80 mol %. The polyhydric alcohol residues contain propylene glycol residues in a proportion within the range 5 to 60 mol %.

8 Claims, No Drawings

POLYESTER RESIN, HOT MELT ADHESIVE, AND HOT MELT ADHESIVE SOLUTION

CROSS REFERENCE TO RELATED APPLICATIONS

The present application is a 371 application of PCT/JP2013/004613, filed Jul. 30, 2013, the entire contents of which are hereby incorporated herein by reference.

TECHNICAL FIELD

The present invention relates to: a polyester resin for a hot melt adhesive; a hot melt adhesive comprising the polyester resin; and a hot melt adhesive solution containing the polyester resin.

BACKGROUND ART

A hot melt adhesive comprising a polyester resin may be used for forming a hot melt adhesive layer for heat sealing and preparing a heat transfer label on a substrate such as a film, a fabric, and paper.

A hot melt adhesive comprising such a polyester resin is, for example, melted, applied on an appropriate substrate, and then cooled to form a hot melt adhesive layer made from a solidified product of the hot melt adhesive on the substrate (See Patent Literature 1).

In order to apply the hot melt adhesive, equipment for melting the hot melt adhesive by high temperature heating and equipment for cooling the high-temperature hot melt adhesive are needed.

Since equipment such as above mentioned is not needed for a hot melt adhesive solution obtained by dispersing a hot melt adhesive in a solvent, equipment for applying the hot melt adhesive solution can be simplified and also efficiency of an application step can be improved.

However, when preparing the hot melt adhesive solution by dissolving or dispersing a polyester resin in the solvent, keeping stable solubility or dispersibility of the polyester resin is difficult. Hence, the polyester resin in the hot melt adhesive solution may flocculate at normal temperature or the hot melt adhesive solution may gel, leading to low preservation stability of the hot melt adhesive solution.

Also, depending on a use, but generally, adhesiveness of a hot melt layer formed from a hot melt adhesive is preferred to be low at normal temperature. There has not yet been provided a hot melt adhesive solution which can form a hot melt adhesive layer with low adhesiveness at normal temperature but nevertheless contains a polyester resin with high solubility or dispersibility in a solvent.

CITATION LIST

Patent Literature

Patent Literature 1: JP 2004-518007 A

SUMMARY OF INVENTION

Technical Problem

In view of the above circumstances, the objective of the present invention would be to provide: a hot melt adhesive solution containing a polyester resin and a solvent but nevertheless being capable of suppressing flocculation of the polymer and gelation thereof and of forming a hot melt adhesive layer with low adhesiveness at normal temperature; a polyester resin used for preparing the hot melt adhesive solution; and a hot melt adhesive comprising the polyester resin.

Solution to Problem

A polyester resin according to the first aspect is the polyester resin for a hot melt adhesive including a polycarboxylic acid residue and a polyhydric alcohol residue, and the polycarboxylic acid residue contains an aliphatic polycarboxylic acid residue in a proportion within a range of 50 to 80 mol % and the polyhydric alcohol residue contains a propylene glycol residue in a proportion within a range of 5 to 60 mol %.

In a polyester resin according to the second aspect, realized in combination with the first aspect, the aliphatic polycarboxylic acid residue includes a skeleton which is a linear chain of 4 to 10 carbon atoms interconnecting two ester bonds.

In a polyester resin according to the third aspect, realized in combination with the second aspect, the aliphatic polycarboxylic acid residue contains one or more residues selected from a group consisting of an adipic acid residue, a sebacic acid residue, and a dodecanedioic acid residue.

In a polyester resin according to the fourth aspect, realized in combination with any one of the first to third aspects, the polycarboxylic acid residue further contains at least one of a terephthalic acid residue and an isophthalic acid residue.

In a polyester resin according to the fifth aspect, realized in combination with any one of the first to fourth aspects, the polyhydric alcohol residue further contains a dialcohol residue including a skeleton which is a linear chain of 2 to 6 carbon atoms interconnecting two ester bonds.

In a polyester resin according to the sixth aspect, realized in combination with the fifth aspect, the dialcohol residue contains one or more residues selected from a group consisting of an ethylene glycol residue, a 1,4-butanediol residue, and a 1,6-hexanediol residue.

In a hot melt adhesive according to the seventh aspect is comprising the polyester resin according to any one of the first to sixth aspects.

In a hot melt adhesive solution according to the eighth aspect contains the polyester resin according to any one of the first to sixth aspects and a solvent.

Advantageous Effects of Invention

According to one aspect of the present invention, a hot melt adhesive solution can be prepared by combining a polyester resin and a solvent, and this hot melt adhesive solution can suppress flocculation of the polyester resin and gelation thereof, and it is possible to form, from the hot melt adhesive solution, a hot melt adhesive layer with low adhesiveness at normal temperature.

DESCRIPTION OF EMBODIMENTS

A hot melt adhesive solution according to the present embodiment contains a polyester resin and a solvent. The polyester resin includes a polycarboxylic acid residue and a polyhydric alcohol residue. The polycarboxylic acid residue contains an aliphatic polycarboxylic acid residue in a proportion within a range of 50 to 80 mol %. The polyhydric alcohol residue contains a propylene glycol residue in a proportion within a range of 5 to 60 mol %.

In the present embodiment, since the polyester resin used for the hot melt adhesive solution has the composition described above, solubility or dispersibility of the polyester resin in the hot melt adhesive solution is very high. Accordingly, flocculation of the polyester resin in the hot melt adhesive solution and flocculation of the hot melt adhesive solution are suppressed at normal temperature, resulting in high preservation stability of the hot melt adhesive solution. Furthermore, since the polyester resin has the composition described above, adhesiveness at normal temperature of the hot melt adhesive layer formed from the hot melt adhesive solution is lowered. It is considered that the polyester resin gaining appropriate crystallinity contributes to a decrease in adhesiveness at normal temperature of the hot melt adhesive layer.

The present embodiment is described more specifically below.

In the present embodiment, the polycarboxylic acid residue in the polyester resin contains the aliphatic polycarboxylic acid reside and an aromatic polycarboxylic acid residue.

The proportion of the aliphatic polycarboxylic acid reside in the polyester resin is within the range of 50 to 80 mol % as described above. High solubility or dispersibility of the polyester resin in the solvent is ensured within this range. That is, since the polyester resin gains appropriate crystallinity due to the proportion being greater than or equal to 50%, adhesiveness of the hot melt adhesive layer formed from the hot melt adhesive solution is lowered at normal temperature. Also, since the polyester resin is prevented from gaining excessive crystallinity due to the proportion being smaller than or equal to 80%, solubility or dispersibility of the polyester resin in the solvent of the hot melt adhesive solution is high. The proportion is further preferred to be within the range of 55 to 77 mol % and especially preferred to be within the range of 60 to 70 mol %.

The aliphatic polycarboxylic acid residue in the polycarboxylic acid residue is preferred to include, for example, a skeleton which is a linear chain of 4 to 10 carbon atoms interconnecting two ester bonds (ester groups; —(CO)—O—), while the ester bond is a bond between the polycarboxylic acid residue and the polyhydric alcohol residue bonded to the polycarboxylic acid residue. The skeleton, which is a linear chain, may or may not have side chains. When the skeleton, which is a linear chain, contains 4 or more carbon atoms, adhesiveness of the hot melt adhesive layer formed from the hot melt adhesive solution is especially lowered at normal temperature. Also, when the skeleton, which is a linear chain, contains 10 or less carbon atoms, solubility or dispersibility of the polyester resin in the solvent is especially high.

The aliphatic polycarboxylic acid residue is preferred to contain one or more residues selected from a group consisting of an adipic acid residue, a sebacic acid residue, and a dodecanedioic acid residue.

The aromatic polycarboxylic acid residue is not particularly limited but, for example, may contain one or more residues selected from a group consisting of a terephthalic acid residue and an isophthalic acid residue.

In the present embodiment, the polyhydric alcohol residue in the polyester resin contains a propylene glycol residue (1,2-propanediol residue) and a dialcohol residue excluding the propylene glycol residue.

As described above, the polyhydric alcohol residue contains the propylene glycol residue in a proportion within the range of 5 to 60 mol %. Since the polyester resin is prevented from gaining excessive crystallinity due to the proportion being greater than or equal to 5%, solubility or dispersibility of the polyester resin in the hot melt adhesive solution is high. Also, since the polyester resin gains appropriate crystallinity due to the proportion being smaller than or equal to 60%, adhesiveness of the hot melt adhesive layer formed from the hot melt adhesive solution is lowered at normal temperature. The proportion is further preferred to be within the range of 10 to 55 mol % and especially preferred to be within the range of 20 to 50 mol %.

The dialcohol residue excluding the propylene glycol residue is preferred to include a skeleton which is a linear chain of 2 to 6 carbon atoms interconnecting two ester bonds, while the ester bond is a bond between the dialcohol residue and the polycarboxylic acid residue bonded to the dialcohol residue. The skeleton, which is a linear chain, may or may not have side chains bonded to the skeleton. When the skeleton, which is a linear chain, contains 2 or more carbon atoms, adhesiveness of the hot melt adhesive layer formed from the hot melt adhesive solution is especially lowered at normal temperature. Also, when the skeleton, which is a linear chain, contains 6 or less carbon atoms, solubility or dispersibility of the polyester resin in the solvent is especially high.

The dialcohol residue is not particularly limited, but, for example, may contain one or more residues selected from a group consisting of an ethylene glycol residue, a 1,4-butanediol residue, and a 1,6-hexanediol residue.

The polyhydric alcohol residue may further contain a tri- or higher valent residue and, for example, may contain a trimethylolpropane residue. The proportion of the tri- or higher valent residue in the polyhydric alcohol residue is preferred to be smaller than or equal to 10 mol % and further preferred to be smaller than or equal to 3 mol %.

The polyester resin can be obtained by copolymerizing a monomer providing the polycarboxylic acid residue (also referred to as a polycarboxylic acid component) such as the polycarboxylic acid and polycarboxylic acid derivatives and a monomer providing the polyhydric alcohol residue (also referred to as a polyhydric alcohol component) such as the polyhydric alcohol and polyhydric alcohol derivatives. As a method for synthesizing the polyester resin, for example, an appropriate known method is adopted.

In one example of a method for synthesizing the polyester resin, a predetermined amount of the carboxylic acid component and the polyhydric alcohol component are first mixed without a solvent to obtain a mixture. A molar ratio of the polycarboxylic acid component to the polyhydric alcohol component in the mixture is within the range of 1:1.4 to 1:2.4 and preferred to be 1:2.

The mixture then undergoes esterification or transesterification while being heated at a temperature, for example, within the range of 170 to 250° C. with by-products such as water being distilled. As necessary, the reaction system is further heated at a temperature within the range of 230 to 260° C. under reduced pressure with by-products being removed so that the reaction system undergoes polycondensation (low pressure polycondensation). In this way, the polyester resin can be obtained.

To synthesize the polyester resin, one or more appropriate catalysts such as an esterification catalyst, a transesterification catalyst, and a polycondensation catalyst can be used.

Preferably, the softening point of the polyester resin is less than or equal to 150° C., which lead to high solubility or dispersibility of the polyester resin in the solvent. Further preferably, the softening point is within the range of 30 to 130° C. and especially preferably within the range of 40 to 110° C. The softening point of the polyester resin can be easily adjusted by changing composition of a monomer which is an ingredient of the polyester resin, molecular weight of the polyester resin, and the like.

Weigh-average molecular weight of the polyester resin is preferably within the range of 20000 to 200000, further preferably within the range of 50000 to 170000, and especially preferably within the range of 70000 to 150000. When the weight-average molecular weight is too small, adhesiveness of the polyester resin tends to lower. When the weight-average molecular weight is too large, solubility or dispersibility of the polyester resin in the solvent tends to decrease. The weight-average molecular weight of the polyester resin can be easily adjusted by setting an appropriate synthesis condition for the polyester resin. The weight-average molecular weight of the polyester resin is a value (polystyrene conversion) measured by gel permeation chromatography.

The solvent in the hot melt adhesive solution may contain, for example, one or more compounds selected from a group consisting of aromatic hydrocarbons, aliphatic hydrocarbons, alicyclic hydrocarbons, alcohols, esters, ketones, glycol ethers, chlorohydrocarbons, and ethers. Especially, the solvent is preferred to contain one or more compounds selected from a group consisting of aromatic hydrocarbons, esters, and ketones. Furthermore, the solvent is preferred to contain one or more compounds selected from a group consisting of a toluene, a coal tar naphtha, an ethyl acetate, a methyl ethyl ketone, and a cyclohexane.

The hot melt adhesive solution may further contain one or more appropriate additives excluding the polyester resin and the solvent. As necessary, the hot melt adhesive solution may contain, for example, one or more ingredients selected from a group consisting of an antiblocking agent, a tackifier, an antioxidant, an ultraviolet absorber, a stabilizer, an antistatic agent, an inorganic or organic filler, and a powdery or particulate additive such as a metal power and a pigment. The antiblocking agent may contain, for example, one or more compounds selected from a group consisting of a silica, a talc, an alumina, a calcium carbonate, a calcium phosphate, urethane beads, acrylic beads, and silicon beads. The tackifier may contain, for example, one or more compounds selected from a group consisting of a polyurethane resin, a polyamide resin, a terpene phenol resin, and a rosin ester resin. The antioxidant may contain, for example, a hindered phenol resin. The ultraviolet absorber may contain, for example, one or more compounds selected from a group consisting of benzophenone compounds and tinuvin compounds. The stabilizer may contain, for example, one or more compounds selected from a group consisting of a phosphoric acid, a phosphorous acid, a phosphate, a phosphite, and ester compounds. The antistatic agent may contain, for example, one or more compounds selected from a group consisting of a polyoxyethylene alkylamine and a glycerol fatty acid ester. The inorganic or organic filler may contain, for example, one or more ingredients selected from a group consisting of a silica, a talc, and a cellulose. The powdery or particulate additives such as a metal powder and a pigment may contain, for example, a titanium oxide.

The hot melt adhesive solution is prepared by combining the polyester resin, the solvent, and one or more additives when necessary.

The proportion of the polyester resin in the hot melt adhesive solution is not particularly limited but preferred to be within the range of 5 to 40 mol %. Since the hot melt adhesive solution has appropriate viscosity due to the proportion being greater than or equal to 5 mol %, efficiency of applying the hot melt adhesive solution on appropriate substrate is increased. Also, since the proportion is less than or equal to 40 mol %, flocculation of the polyester resin and gelation of the hot melt adhesive solution can especially be prevented at normal temperature. The proportion is further preferred to be within the range of 10 to 35 mol % and especially preferred to be within the range of 15 to 30 mol %.

The hot melt adhesive layer containing the polyester resin can be formed on a substrate by applying the hot melt adhesive solution on an appropriate substrate and further removing the solvent from the hot melt adhesive solution by heat drying.

The substrate is not particularly limited but is of material selected from a synthetic resin, rubber, a fiber, a wood, glass, a metal, and paper.

A method of applying the hot melt adhesive solution is not particularly limited but, for example, is selected from an immersion method, a curtain coating method, a gravure coating method, a wire bar method, a spray coating method, a reverse coating method, and a die coating method.

Examples

For each of Examples and Comparative Example, the polycarboxylic acid and the polyhydric alcohol were prepared as shown in Tables below. In the Tables, numerical values related to respective compounds in the polycarboxylic acid indicate proportions of the respective compounds in the whole polycarboxylic acid (mole percentage), and numerical values related to respective compounds in the polyhydric alcohol indicate proportions of the respective compounds in the whole polyhydric alcohol (mole percentage).

The polycarboxylic acid and the polyhydric alcohol were added at molar ratio of 1:2 in a transesterification reactor, followed by addition of potassium titanium oxalate in a proportion of 0.1 mol %, to obtain a mixture. The mixture was then heated up to 250° C. under a nitrogen atmosphere in the transesterification reactor to cause transesterification and distill water which was a by-product thereof. Then, the mixture was heated up to 250 to 260° C. and the pressure was reduced to 1 mmHg (1.3 hPa) to cause polycondensation and remove diol which was a by-product thereof. In this way, the polyester resin was obtained.

The softening point, glass transition point, and weight-average molecular weight of each polyester resin are shown in the Tables below.

With regard to each polyester resin, the hot melt adhesive solution was obtained by mixing 20 parts by mass of the polyester resin, 20 parts by mass of methyl ethyl ketone, and 60 parts by mass of toluene.

[Stability Test]
Test 1 (Initial State)

The hot melt adhesive solutions immediately after preparation were left at 25° C. for one hour. The results were classified into following ratings: the rating "3" indicating a state where neither flocculation of the polyester resin in the hot melt adhesive solution nor gelation of the hot melt adhesive solution was observed; the rating "1" indicating a state where at least one of flocculation of the polyester resin and gelation of the hot melt adhesive solution was observed; the rating "2" indicating a state intermediate between the states indicated by the ratings "3" and "1". The results are shown in the following Tables.

Test 2 (Stability at Normal Temperature)

The hot melt adhesive solution rated as the rating "3" or "2" in the above Test 1 was left at 25° C. for 120 hours. The results were classified into following ratings: the rating "3"

indicating a state where neither flocculation of the polyester resin in the hot melt adhesive solution nor gelation of the hot melt adhesive solution was observed; the rating "1" indicating a state where at least one of flocculation of the polyester resin and gelation of the hot melt adhesive solution was observed; the rating "2" indicating a state intermediate between the states indicated by the ratings "3" and "1". The results are shown in the following Tables.

Test 3 (Stability at Low Temperature)

The hot melt adhesive solution rated as the rating "3" or "2" in the above Test 1 was left at 5° C. for 120 hours. The results were classified into following ratings: the rating "3" indicating a state where neither flocculation of the polyester resin in the hot melt adhesive solution nor gelation of the hot melt adhesive solution was observed; the rating "1" indicating at least one of flocculation of the polyester resin and gelation of the hot melt adhesive solution was observed; the rating "2" indicating a state intermediate between the states indicated by the ratings "3" and "1". The results are shown in the following Tables.

[Preparation of the Hot Melt Adhesive Layer]

A sheet made from A-PET (amorphous polyethylene terephthalate) was prepared as a substrate.

The hot melt adhesive solution rated as the rating "3" or "2" in the above Test 1 was applied on the substrate with a bar coater #4 and then heated at 100° C. for 5 minutes. In this way, the hot melt adhesive layer with thickness of about 2 μm was formed on the substrate.

[Adhesion Test at Normal Temperature]

A sheet made from A-PET (amorphous polyethylene terephthalate) was prepared as a member to be situated on the hot melt adhesive layer.

The member and the hot melt adhesive layer made by the above method were stacked and then bonded together at 25° C. at a humidity of 60% under a pressure of 0.1 MPa for 10 seconds.

Succeedingly, adhesiveness between the hot melt adhesive layer and the member at normal temperature was observed. The results were classified into following ratings: the rating "3" indicating a state where adhesion at the interface between the hot melt adhesive layer and the member was not observed; the rating "2" indicating a state where adhesion at small part of the interface was observed; the rating "1" indicating a state where adhesion at large part of the interface was observed. The results are shown in the following Tables.

[Peel Strength Test]

A sheet made from A-PET (amorphous polyethylene terephthalate) was prepared as a member to be bonded to the hot melt adhesive layer.

The member and the hot melt adhesive layer made by the same method as in the adhesion test at normal temperature were stacked and a stack of the member and the hot melt adhesive layer was subjected to thermocompression bonding at 140° C. under a pressure of 0.4 MPa for 5 seconds.

Succeedingly, 180° peel strength (N/m) between the hot melt adhesive and the member was measured. The results are shown in the Tables below.

TABLE 1

| | | Example | | | |
|---|---|---|---|---|---|
| | | 1 | 2 | 3 | 4 |
| Polycarboxylic acid | Adipic acid | | | | |
| | Sebacic acid | 50 | 55 | 50 | |
| | Dodecanedioic acid | | | 10 | 65 |
| | Terephthalic acid | 50 | 45 | 40 | 35 |
| | Isophthalic acid | | | | |
| Polyhydric alcohol | Propylene glycol | 60 | 50 | 40 | 30 |
| | Ethylene glycol | | | | 60 |
| | 1,4-Butanediol | 40 | 47 | 59 | |
| | 1,6-Hexanediol | | | | 8 |
| | Trimethylolpropane | | 3 | 1 | 2 |
| Physical properties of the polyester resin | Softening point | 108 | 98 | 96 | 51 |
| | Weight-average molecular weight | 72100 | 143100 | 95300 | 120100 |
| Stability test | Test 1 (Immediately after preparation) | 3 | 3 | 3 | 3 |
| | Test2 (Stability at normal temperature) | 3 | 3 | 3 | 3 |
| | Test3 (Stability at low temperature) | 3 | 3 | 3 | 3 |
| Adhesion test at normal Temperature | | 3 | 3 | 3 | 3 |
| Peel strength test N/m | | 305 | 357 | 353 | 368 |

TABLE 2

| | | Example | | | |
|---|---|---|---|---|---|
| | | 5 | 6 | 7 | 8 |
| Polycarboxylic acid | Adipic acid | 60 | | 10 | |
| | Sebacic acid | | | 70 | |
| | Dodecanedioic acid | | 70 | | 60 |
| | Terephthalic acid | 30 | 20 | 20 | 40 |
| | Isophthalic acid | 10 | 10 | | |
| Polyhydric alcohol | Propylene glycol | 20 | 10 | 10 | 5 |
| | Ethylene glycol | 20 | 90 | 90 | 95 |
| | 1,4-Butanediol | 59 | | | |
| | 1,6-Hexanediol | | | | |
| | Trimethylolpropane | 1 | | | |

TABLE 2-continued

|  |  | Example | | | |
|---|---|---|---|---|---|
|  |  | 5 | 6 | 7 | 8 |
| Physical properties of the polyester resin | Softening point | 70 | 55 | 45 | 53 |
|  | Weight-average molecular weight | 83400 | 142200 | 74300 | 120600 |
| Stability test | Test 1 (Immediately after preparation) | 3 | 3 | 3 | 3 |
|  | Test2 (Stability at normal temperature) | 3 | 3 | 3 | 3 |
|  | Test3 (Stability at low temperature) | 3 | 3 | 2 | 2 |
| Adhesion test at normal Temperature |  | 3 | 3 | 3 | 3 |
| Peel strength test N/m |  | 379 | 373 | 316 | 325 |

TABLE 3

|  |  | Example | | Comparative Example | |
|---|---|---|---|---|---|
|  |  | 9 | 10 | 1 | 2 |
| Polycarboxylic acid | Adipic acid |  |  |  |  |
|  | Sebacic acid | 80 | 50 |  | 50 |
|  | Dodecanedioic acid |  |  | 40 |  |
|  | Terephthalic acid | 20 | 40 | 60 | 50 |
|  | Isophthalic acid |  | 10 |  |  |
| Polyhydric alcohol | Propylene glycol | 60 | 5 | 3 |  |
|  | Ethylene glycol |  | 92 | 20 |  |
|  | 1,4-Butanediol | 38 |  | 75 | 100 |
|  | 1,6-Hexanediol |  |  |  |  |
|  | Trimethylolpropane | 2 | 3 | 2 |  |
| Physical properties of the polyester resin | Softening point | 46 | 121 | 96 | 112 |
|  | Weight-average molecular weight | 132100 | 147200 | 99000 | 132000 |
| Stability test | Test 1 (Immediately after preparation) | 3 | 3 | 1 | 1 |
|  | Test2 (Stability at normal temperature) | 3 | 3 | — | — |
|  | Test3 (Stability at low temperature) | 3 | 2 | — | — |
| Adhesion test at normal Temperature |  | 3 | 3 | — | — |
| Peel strength test N/m |  | 300 | 314 | — | — |

TABLE 4

|  |  | Comparative Example | | | | |
|---|---|---|---|---|---|---|
|  |  | 3 | 4 | 5 | 6 | 7 |
| Polycarboxylic acid | Adipic acid | 55 |  |  |  |  |
|  | Sebacic acid |  |  | 70 | 50 | 50 |
|  | Dodecanedioic acid |  | 85 | 15 | 10 | 10 |
|  | Terephthalic acid | 45 | 15 | 15 | 40 | 40 |
|  | Isophthalic acid |  |  |  |  |  |
| Polyhydric alcohol | Propylene glycol |  | 3 | 30 | 3 | 65 |
|  | Ethylene glycol | 30 | 95 |  |  |  |
|  | 1,4-Butanediol | 70 |  | 70 | 95 | 34 |
|  | 1,6-Hexanediol |  |  |  |  |  |
|  | Trimethylolpropane |  | 2 |  | 2 | 1 |
| Physical properties of the polyester resin | Softening point | 82 | 47 | 46 | 68 | 79 |
|  | Weight-average molecular weight | 82100 | 150100 | 112000 | 131000 | 121300 |
| Stability test | Test1 (Immediately after preparation) | 1 | 1 | 1 | 1 | 3 |
|  | Test2 (Stability at normal temperature) | — | — | — | — | 3 |
|  | Test3 (Stability at low temperature) | — | — | — | — | 3 |
| Adhesion test at normal Temperature |  | — | — | — | — | 1 |
| Peel strength test N/m |  | — | — | — | — | 209 |

The invention claimed is:

1. A polyester resin for a hot melt adhesive, comprising:
a polycarboxylic acid residue; and
a polyhydric alcohol residue,
the polycarboxylic acid residue consisting of 50 to 80 mol % of an aliphatic polycarboxylic acid residue and at least one of a terephthalic acid residue and an isophthalic acid residue, the polyhydric alcohol residue containing a propylene glycol residue in a proportion within a range of 30 to 60 mol %.

2. The polyester resin according to claim 1, wherein the aliphatic polycarboxylic acid residue has a skeleton which is a linear chain of 4 to 10 carbon atoms interconnecting two ester bonds.

3. The polyester resin according to claim 2, wherein the aliphatic polycarboxylic acid residue contains at least one residue selected from a group consisting of an adipic acid residue, a sebacic acid residue, and a dodecanedioic acid residue.

4. The polyester resin according to claim 1, wherein the polyhydric alcohol residue further contains a dialcohol residue including a skeleton which is a linear chain of 2 to 6 carbon atoms interconnecting two ester bonds.

5. The polyester resin according to claim 4, wherein the dialcohol residue contains one or more residues selected from a group consisting of an ethylene glycol residue, a 1,4-butanediol residue, and a 1,6-hexanediol residue.

6. A hot melt adhesive comprising the polyester resin according to claim 1.

7. A hot melt adhesive solution comprising:
the polyester resin according to claim 1; and
a solvent.

8. The polyester resin according to claim 4, wherein:
the dialcohol residue contains one or more residues selected from a group consisting of a 1,4-butanediol residue, and a 1,6-hexanediol residue.

* * * * *